US006349179B1

(12) United States Patent
Taku

(10) Patent No.: US 6,349,179 B1
(45) Date of Patent: Feb. 19, 2002

(54) CAMERA

(75) Inventor: Masakazu Taku, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/192,699

(22) Filed: Nov. 16, 1998

Related U.S. Application Data

(62) Division of application No. 08/855,152, filed on May 13, 1997, which is a continuation of application No. 08/423,902, filed on Apr. 18, 1995, now abandoned.

(30) Foreign Application Priority Data

Apr. 21, 1994 (JP) .............................................. 6-105036
Apr. 5, 1995 (JP) .............................................. 7-080300
Apr. 5, 1995 (JP) .............................................. 7-080301

(51) Int. Cl.[7] .............................................. G03B 17/02
(52) U.S. Cl. ...................................... 396/535; 396/539
(58) Field of Search ................................ 396/535, 539, 396/540, 541, 176, 205; 362/9

(56) References Cited

U.S. PATENT DOCUMENTS

| 2,295,071 | A | * | 9/1942 | Ansley | 67/31 |
| 2,989,906 | A | * | 6/1961 | Rentschler | 95/11 |
| 3,049,611 | A | * | 8/1962 | Kluge | 240/1.3 |
| 4,148,573 | A | * | 4/1979 | Yamanaka | 396/176 |
| 4,455,074 | A | * | 6/1984 | Wong et al. | 354/173.1 |
| 4,519,687 | A | * | 5/1985 | Kuge | 354/202 |
| 4,557,574 | A | * | 12/1985 | Kohno et al. | 354/288 |
| 4,601,562 | A | * | 7/1986 | Yoneyama et al. | 354/170 |
| 4,733,265 | A | * | 3/1988 | Haraguchi et al. | 354/484 |
| 5,001,505 | A | * | 3/1991 | Tosaka et al. | 354/173.1 |
| 5,555,052 | A | * | 9/1996 | Pearson | 354/203 |
| 5,615,394 | A | * | 3/1997 | Albrecht | 396/6 |
| 5,659,803 | A | * | 8/1997 | Takagi et al. | 396/6 |
| 5,669,027 | A | * | 9/1997 | Katano et al. | 396/535 |
| 5,752,119 | A | * | 5/1998 | Miyamoto et al. | 396/535 |
| 5,870,645 | A | * | 2/1999 | Tanbara et al. | 396/539 |
| 6,061,531 | A | * | 5/2000 | Yamaguchi | 396/535 |
| 6,081,666 | A | * | 6/2000 | Zawodny et al. | 396/6 |

* cited by examiner

Primary Examiner—Christopher E. Mahoney
(74) Attorney, Agent, or Firm—Robin, Blecker & Daley

(57) ABSTRACT

A camera comprises a cartridge chamber, a spool chamber, and a battery chamber located on the side of at least one of the cartridge chamber and the spool chamber with respect to an optical axis of a photo-taking optical unit disposed between the cartridge chamber and the spool chamber, and at least one of above and below at least one of the cartridge chamber and the spool chamber.

54 Claims, 14 Drawing Sheets

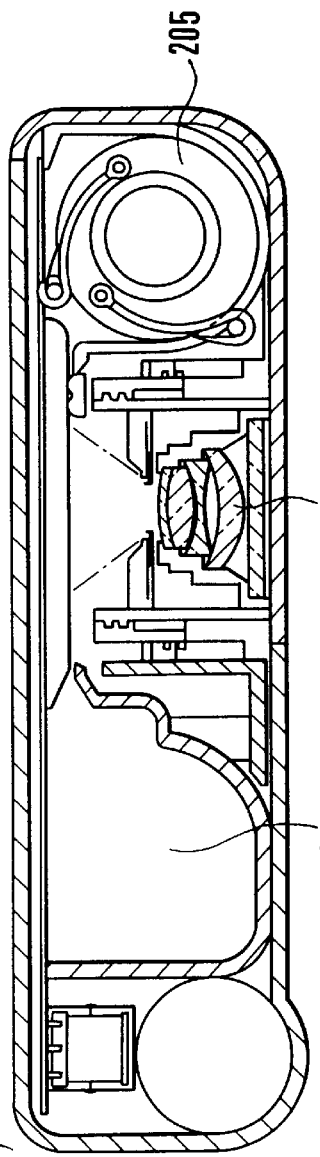
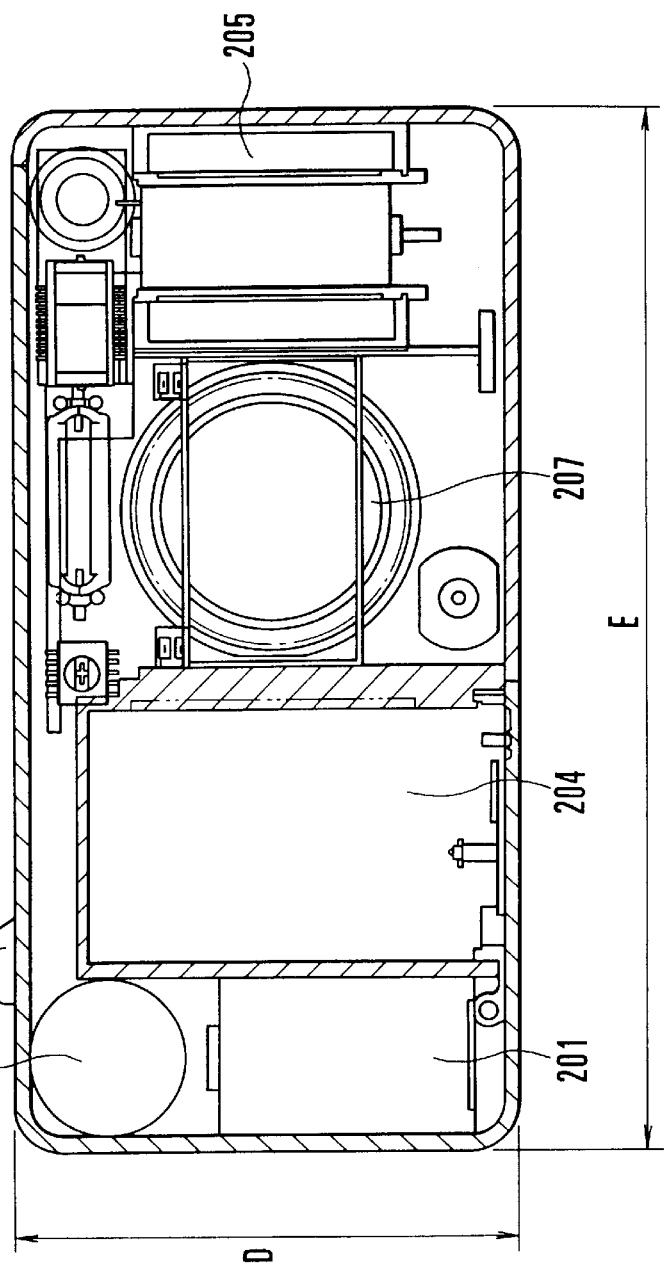
FIG.15(a)
FIG.15(b)

CAMERA

CROSS-REFERENCE TO RELATED APPLICATIONS

This application is a division of co-pending application Ser. No. 08/855,152, filed May 13, 1997; which is a continuation of application Ser. No. 08/423,902, filed Apr. 18, 1995 (abandoned).

BACKGROUND OF THE INVENTION

1. Field of the Invention

This invention relates to an improvement on the layout of internal structural arrangement of a camera.

2. Description of the Related Art

The layout of internal structural arrangement of conventional cameras has been either as shown in FIG. 14 or in FIGS. 15(a) and 15(b). FIG. 14 shows a case where a battery 201 is stowed below an aperture part 209 between a spool chamber 205 and a film cartridge chamber 204. FIGS. 15(a) and 15(b) show another case where the battery 201 and the main capacitor 206 of a flash device are stowed in a grip part of the camera.

However, the layout of the camera having the battery 201 stowed below the aperture part 209 as shown in FIG. 14 necessitates not only a contact piece 203 and a movable contact piece 202 for contact with electrodes of the battery 201 but also arranging the length A of the opening of a battery chamber to be sufficiently longer than the length C of the battery 201 to facilitate taking out the battery 201. A distance B necessary for these requirements thus increases to a considerable extent. As a result, the width X of the whole camera inevitably increases. Further, since a dimension Y from a photo-taking optical axis to the bottom surface of the camera is determined by the sum of the diameter of the battery 201 and the opening dimension of the aperture part 209, not only the height of the camera increases but also an unnecessary space increases. As a result, the size of the camera unnecessarily becomes larger.

Further, in the case of the layout as shown in FIGS. 15(a) and 15(b), since the battery 201 and the main capacitor 206 are stowed further on the outer side than the film cartridge chamber 204, the width E of the camera much increases although its height H decreases. As a result, the camera would inconveniently run out in part from a pocket or the like when carrying the camera.

Besides, the height D of the camera becomes too small for keeping a firm hold of the camera in a picture-taking posture because of a space left between the palm of the hand and the camera body, while the width E of the camera is long to make a distance between a photo-taking lens 207 and a release button 208 also long. Therefore, when the release button 208 is operated, the camera tends to turn a little on its grip part to increase a camera shake.

SUMMARY OF THE INVENTION

It is one aspect of this invention to provide a camera which can be arranged in a compact apposite shape without bringing about any unnecessary space. To attain this aspect, the camera according to this invention comprises a cartridge chamber, a spool chamber, and a battery chamber located on the side of at least one of the cartridge chamber and the spool chamber with respect to an optical axis of a photo-taking optical unit disposed between the cartridge chamber and the spool chamber, and at least one of above and below at least one of the cartridge chamber and the spool chamber.

The above and other aspects and features of this invention will become apparent from the following detailed description of preferred embodiments thereof taken in connection with the accompanying drawings.

BRIEF DESCRIPTION OF THE DRAWINGS

FIGS. 15(a) and 15(b) are sectional views showing the layout of another conventional camera.

DETAILED DESCRIPTION OF THE PREFERRED EMBODIMENTS

Embodiments of this invention are described below with reference to the drawings.

Figure 1:
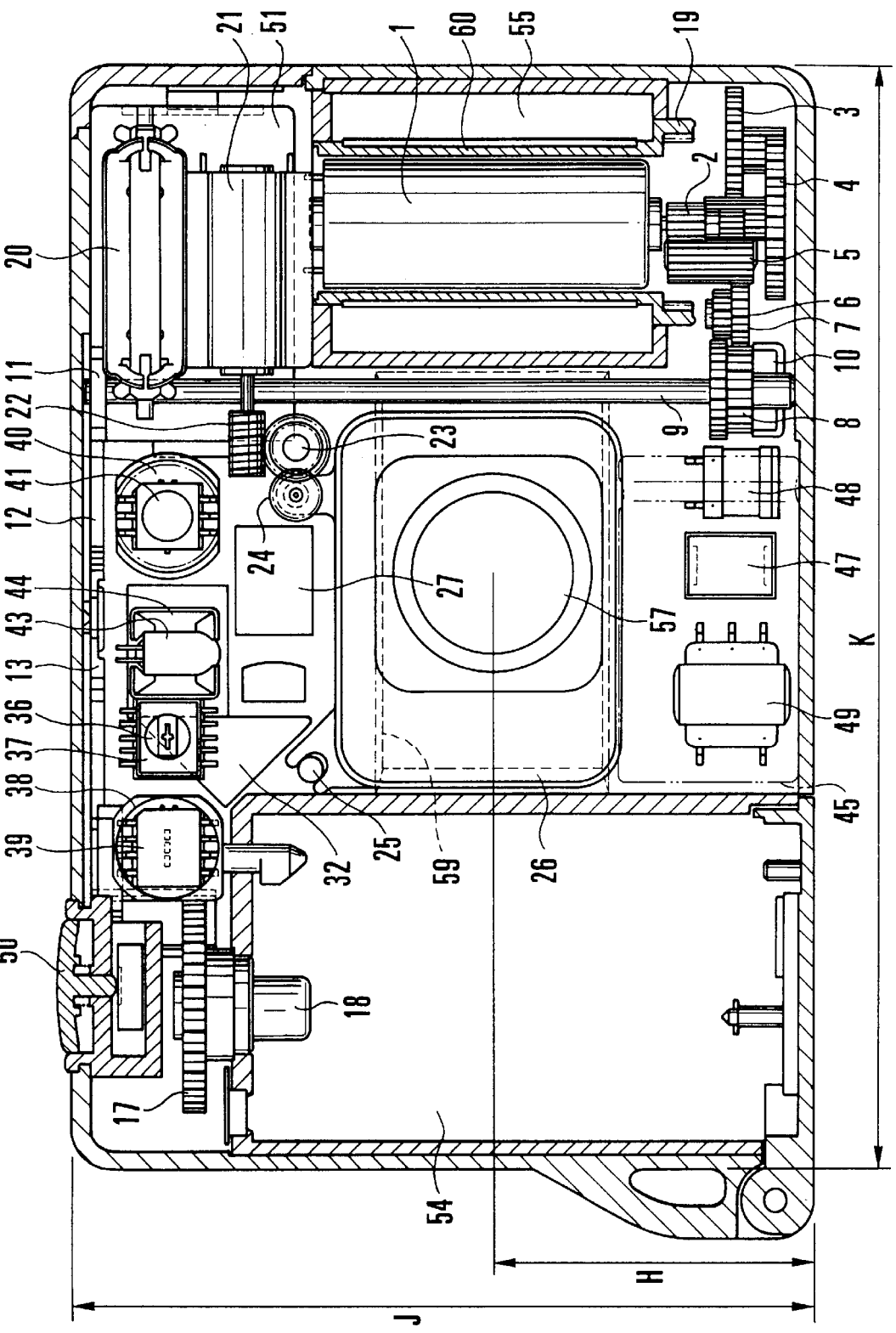
FIG. 1 is a vertical sectional view showing the layout of a whole camera arranged according to this invention as a first embodiment thereof.
Figure 2:
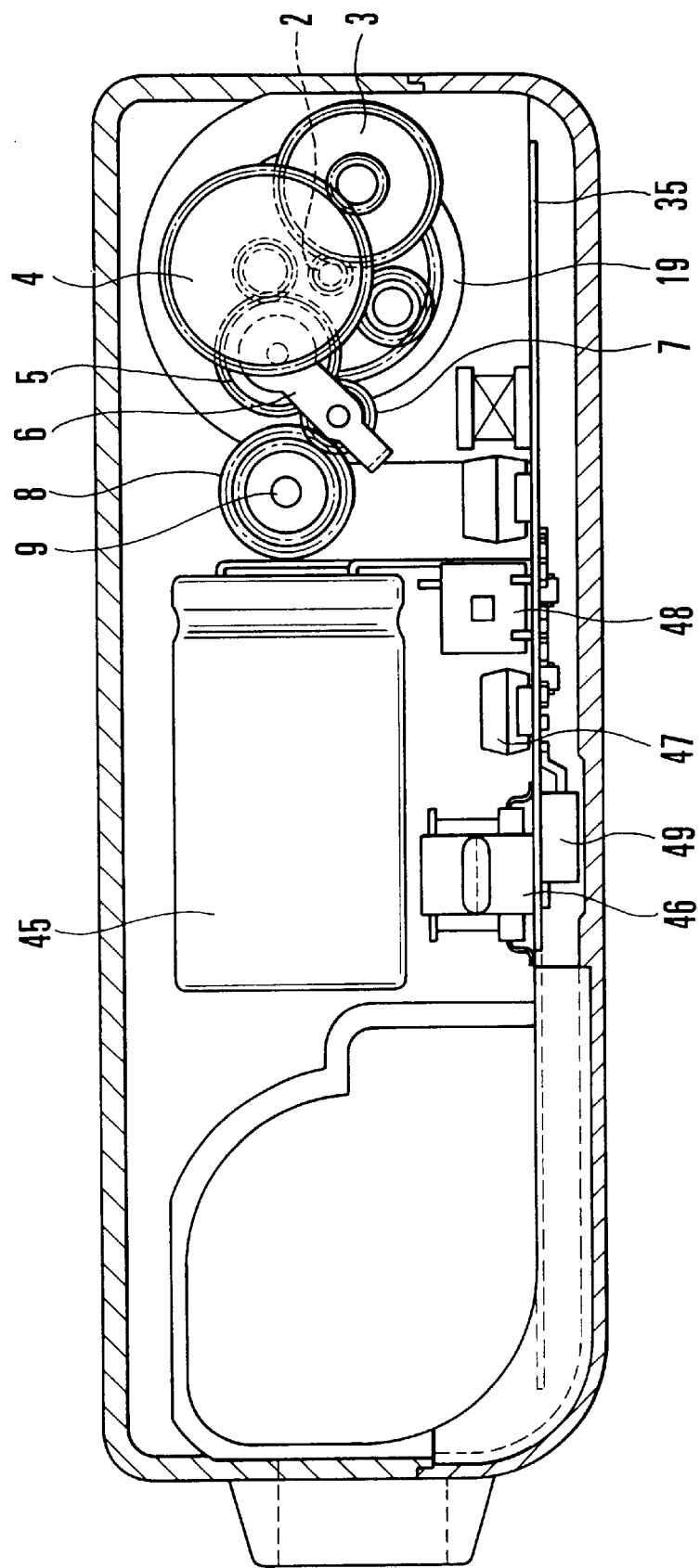
FIG. 2 is a transverse sectional view of the camera of FIG. 1 taken from the lower side thereof.
Figure 3:
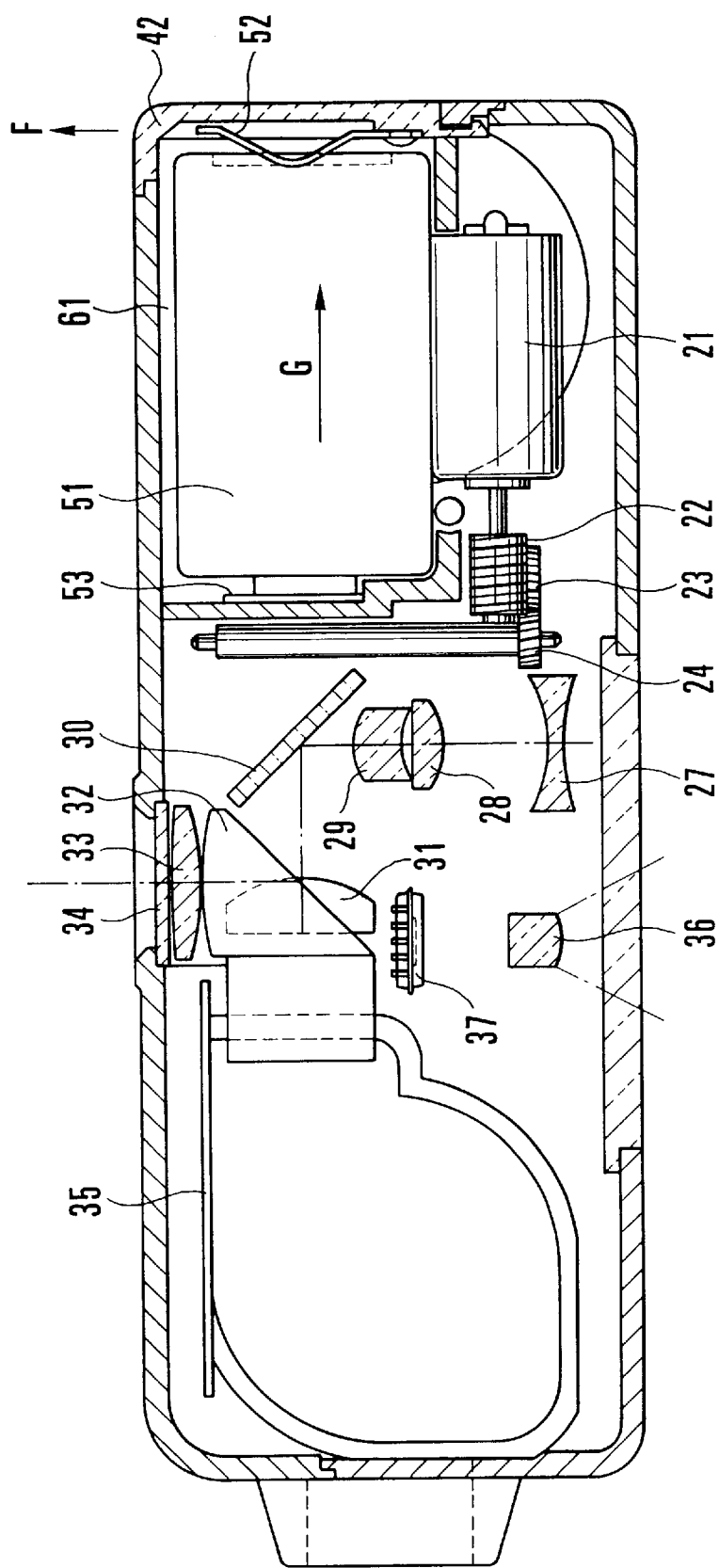
FIG. 3 is a transverse sectional view of the camera of FIG. 1 taken along the optical axis of a viewfinder of the camera.
Figure 4:
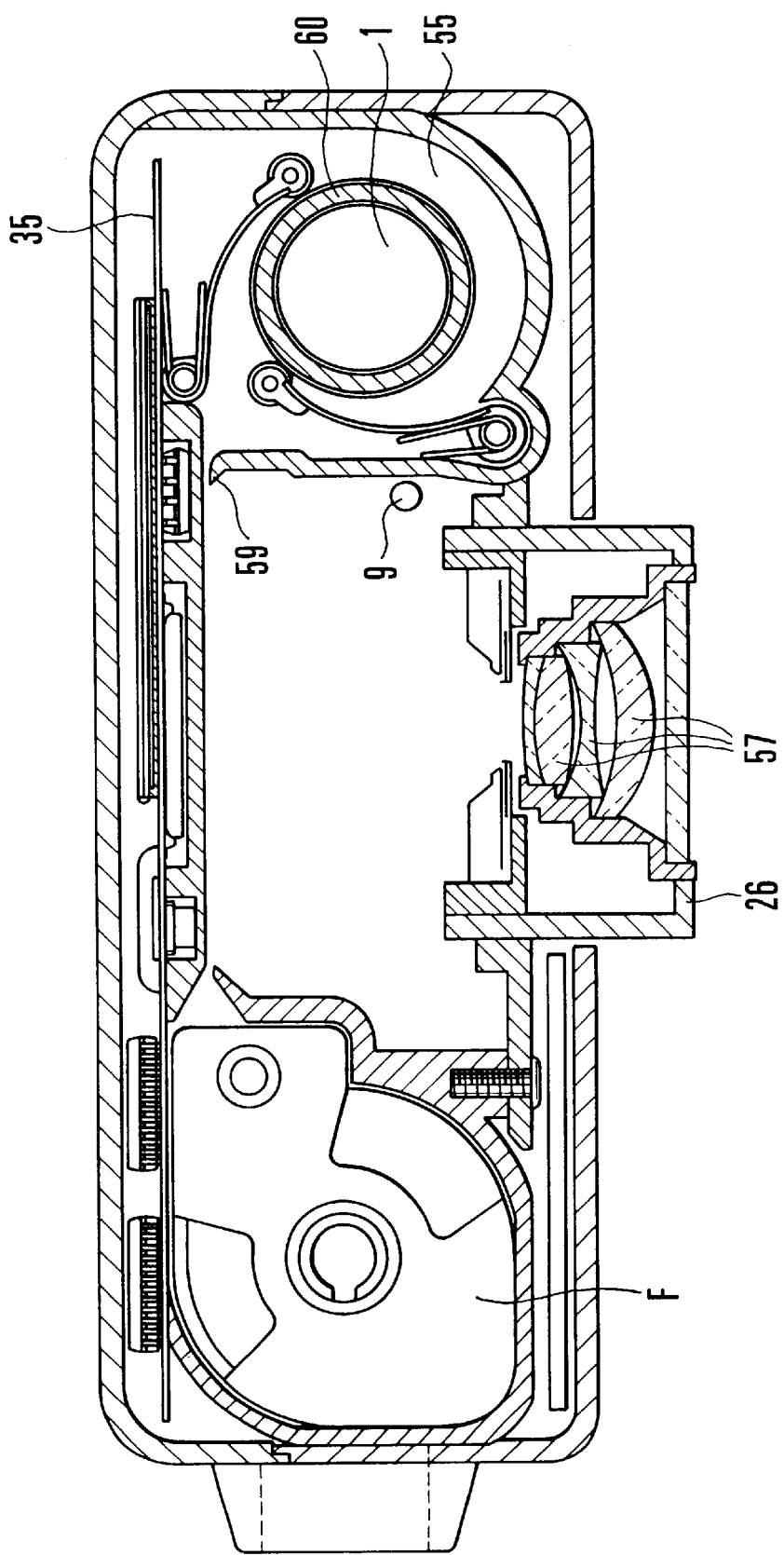
FIG. 4 is a transverse sectional view of the camera of FIG. 1 taken across a middle part thereof.
Figure 5:
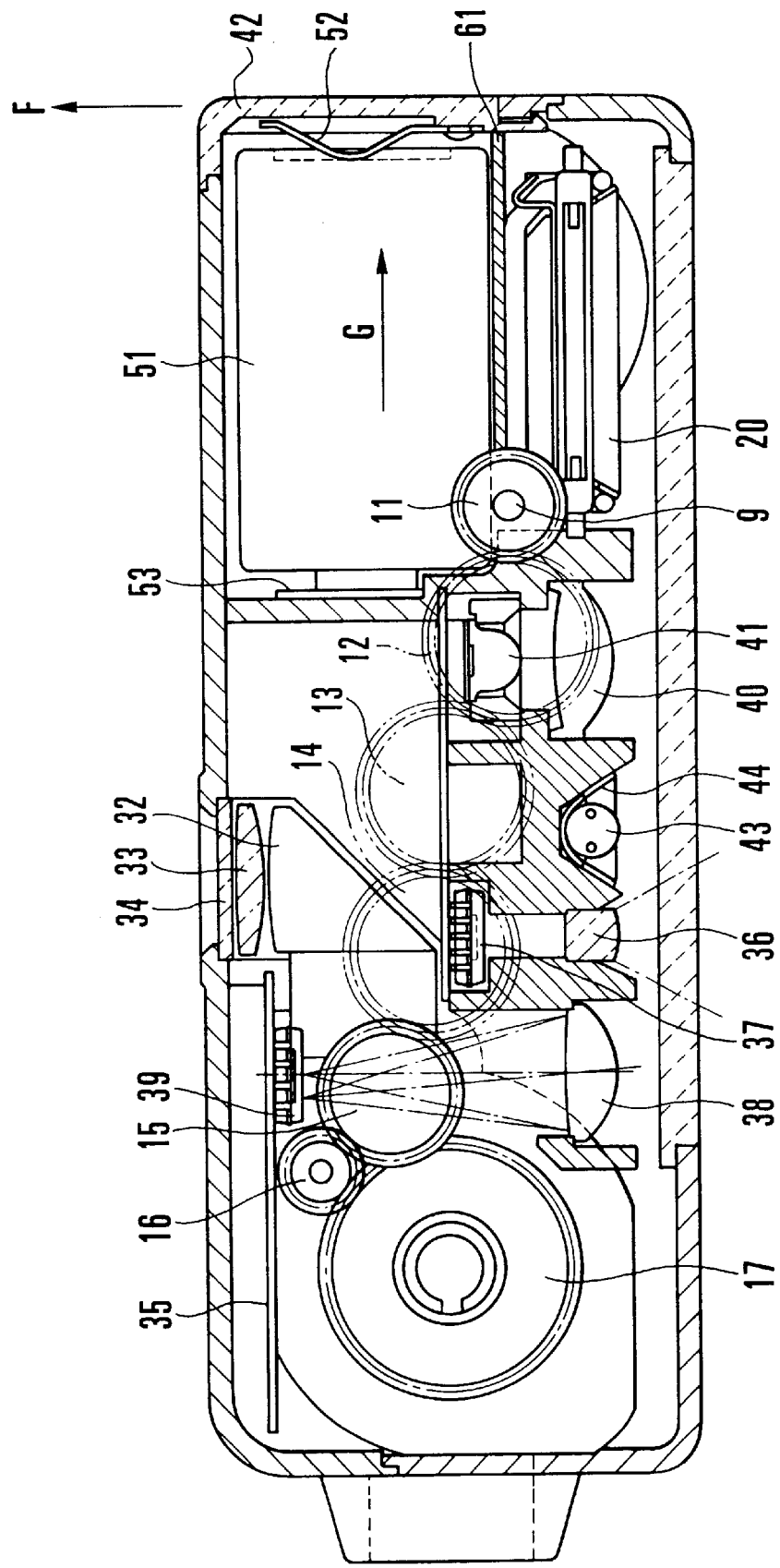
FIG. 5 is a transverse sectional view of the camera of FIG. 1 taken from the upper side thereof.
Figure 6:
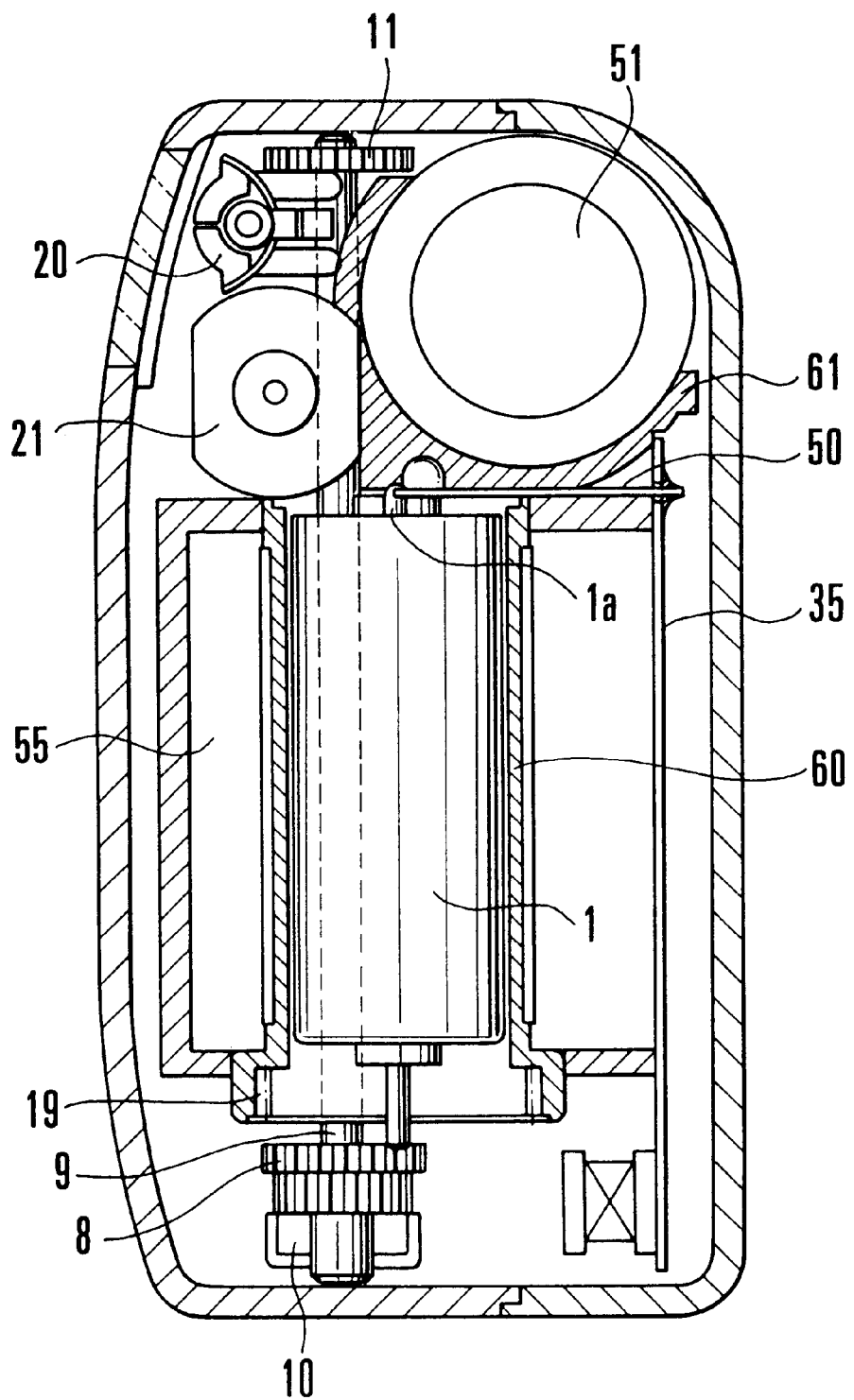
FIG. 6 is a vertical sectional view of a spool chamber of the camera of FIG. 1.
Figure 7:
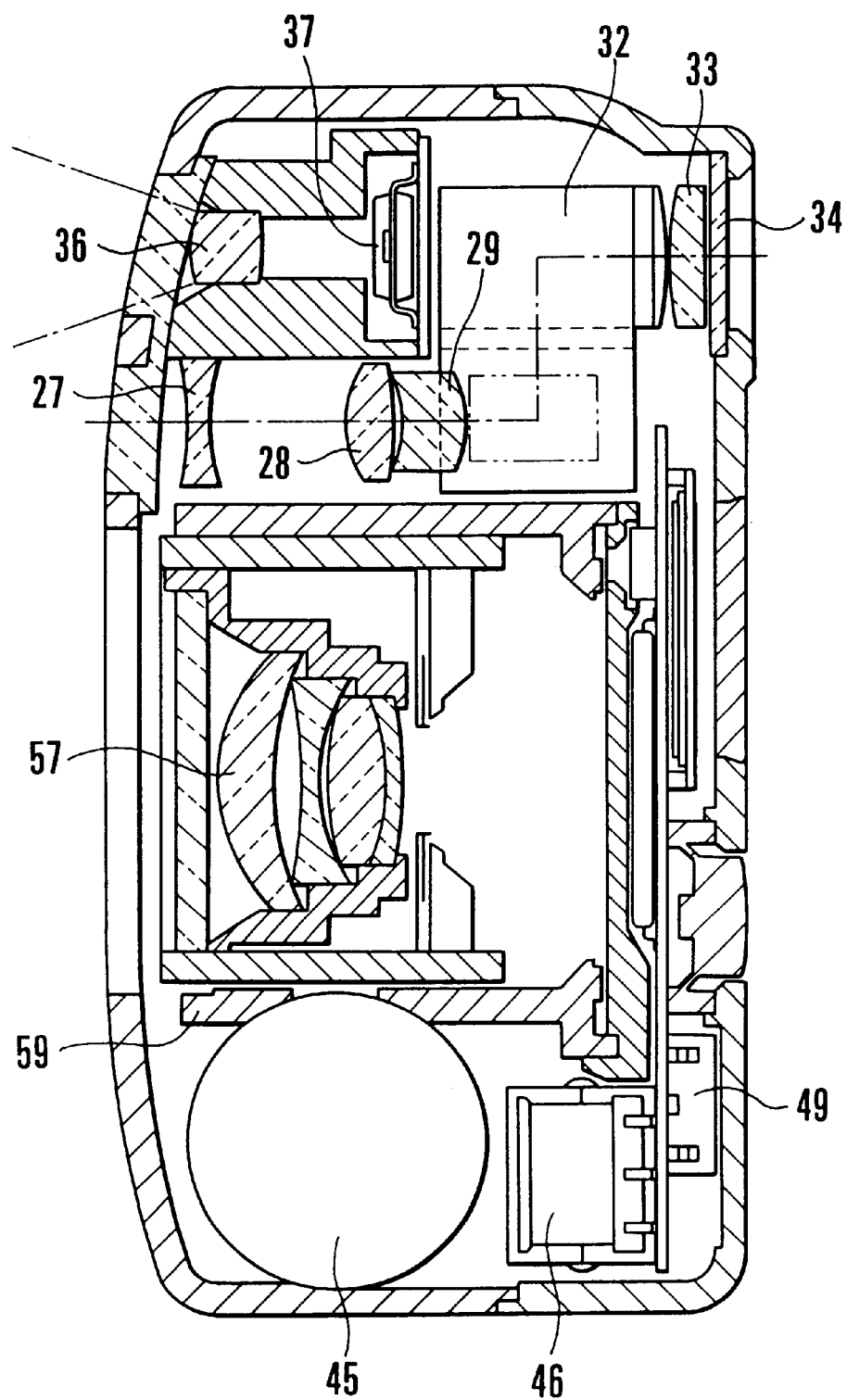
FIG. 7 is a vertical sectional view of the camera of FIG. 1 taken across a middle part thereof.

FIGS. 1 to 7 show a camera which is arranged according to this invention as a first embodiment thereof. FIG. 1 is a vertical sectional view showing the layout of about the whole of the camera. FIG. 2 is a transverse sectional view showing the camera as viewed from the lower side of the camera. FIG. 3 is a transverse sectional view of the camera taken along the optical axis of a viewfinder. FIG. 4 is a transverse sectional view taken across a middle part of the camera. FIG. 5 is a transverse sectional view taken on the upper side of the camera. FIG. 6 is a vertical view of the spool chamber of the camera. FIG. 7 is a vertical sectional view taken across a middle part of the camera.

Referring to FIG. 1, a motor 1 is arranged to wind and rewind a film. A spool chamber 55 has a film take-up spool 60. A gear train (2 to 8) is provided for reduction and planetary change-over. The output of the reduction and planetary change-over gear train (2 to 8) is transmitted to a shaft 9 via a one-way clutch 10 to cause the shaft 10 to rotate. A gear 11 is disposed on the upper side in the camera and is connected to the shaft 9. The output of the gear 11 is transmitted through idler gears 12 to 16 to a fork gear 17, as shown in FIG. 5. The output of the fork gear 17 is transmitted to the shaft of a film cartridge F (see FIG. 4) through a fork 18 which is arranged to rotate integrally with the fork gear 17. Thrust driving and rewinding actions are performed on the film through this arrangement. There are provided a flash emitting part 20, a lens barrel driving motor 21 arranged to drive, through a gear 23 and a worm gear 22, a linear-motion screw 24 of a lens barrel 26 which include a photo-taking lens 57, a fitting shaft 25 arranged to prevent rotation of the lens barrel 26.

A light measuring IC 37 is arranged to measure through a lens 36 a quantity of light obtained at a photo-taking angle of view. The light measuring IC 37, a red-eye preventing lamp 43 and its reflection shade 44 are disposed on the front side of a Porro prism 32 of a viewfinder (see FIG. 5). A light receiving element 39 which is provided for automatic focusing with a lens 38 disposed in front of it is arranged to receive infrared light projected from a light projecting I RED 41 through a lens 40 and reflected by an object of shooting. Information on distance measurement is computed on the basis of a light receiving signal outputted from the automatic focusing light receiving element 39.

The flash emitting part, the light projecting and receiving parts for automatic focusing, the light measuring part for AE (automatic exposure) and the red-eye preventing lamp 43 are thus approximately linearly arranged in the uppermost part of the camera. An advantage of this arrangement lies in that the possibility of having the projected and receiving light eclipsed by a finger when the camera is held by hand can be almost completely eliminated.

An objective lens 27 which is provided for the viewfinder is disposed as close to the photo-taking lens 57 as possible to minimize the parallax of the viewfinder.

Referring to FIG. 2 which is a transverse sectional view taken from the bottom side of the camera, the main capacitor 45 of the flash device has its diameter equal to a distance between the lower side of the camera and the lower side of a light blocking tube 59 (see FIG. 1) which defines a photo-taking optical path. Therefore, the main capacitor 45 is arranged on the front side of the middle part and is connected directly to a printed circuit board 35 (see FIG. 3) which is disposed in rear of the main capacitor 45. The position of the main capacitor 45 permits large electric parts of the flash device, such as a flash device oscillating transformer 46, a trigger coil 48 and a transistor 49, to be arranged in rear of it with a short length of wiring for oscillation and charging of a flash device circuit, so that an electric energy can be efficiently used for these purposes.

Referring to FIG. 5 which shows a transverse sectional view taken from the upper side of the camera, a cylindrical battery 51 is axially inserted sideways into a battery chamber 61. A battery chamber lid 42 is removable by moving it in the direction of arrow F, so that the battery 51 can be taken out by axially moving it in the direction of arrow G. The shaft 9 which vertically connects the film transport system mentioned above extends between the battery 51 and the flash emitting part 20 and between the battery 51 and the lens barrel driving motor 21 as shown in FIG. 3. Further, as shown in FIG. 4, the shaft 9 is of course set between the lens barrel 26 and the spool chamber 55.

Referring to FIG. 6 which is a vertical section of the camera taken across the spool chamber, a reduction system gear and a spool gear 19 which is formed integrally with the spool 60 are disposed in a lower part of the spool chamber 55. The battery chamber 61 is set in a rear part on the upper side of the spool chamber 55. The lens barrel driving motor 21 is disposed in a front part on the upper side of the spool chamber 55. The flash emitting part 20 is disposed above the lens barrel driving motor 21. The gear 11 is disposed in an approximately triangular space defined by a round surface of the battery 51 and a round surface of the reflection shade of the flash emitting part 20. Therefore, the gear 11 can be set without raising the upper surface of the camera. Therefore, the arrangement can be made in the same manner even if the battery 51 is not in the cylindrical shape but is in a square shape having at least one round corner or in a Quonset-hut like shape having a round part facing upward.

FIG. 7 is a vertical section of the camera taken across the middle part of the camera, i.e., on the optical axis of the lens barrel 26 and that of the viewfinder. As shown, an objective lens system (27 to 29) of the viewfinder is disposed close to the photo-taking lens 57. An ocular system (32, 33 and 34) is set on the upper side in the camera. The camera is thus arranged to excel in operability and to have an easily viewable viewfinder.

Further, since the layout described permits the objective lens system (27 to 29) to be disposed close to the photo-taking lens 57, the parallax between the viewfinder and the photo-taking lens 57 can be minimized. Besides, the flash emitting part 20 can be set at a longest distance from the photo-taking lens 57. The layout not only effectively prevents the inconveniences such as the red eye phenomenon but also minimizes the possibility of having the flash light of the flash device eclipsed by camera holding fingers.

Again referring to FIG. 1, a release button 50 is disposed right above the fork gear 17. Therefore, the possibility of a camera shake taking place at the time of a shutter release when the camera is caused to turn around the grip part by an operation on the release button 50 can be minimized since a distance from the release button 50 to the photo-taking lens 57 is short.

As shown in FIGS. 3 and 5, the battery chamber lid 42 is arranged by way of example to be removable by pulling it in the direction of arrow F. However, this invention is not limited to this arrangement. The same effect is attainable, for example, by arranging a battery chamber lid to be removable by rotating it in a bayonet-like manner.

As described above, the film cartridge chamber 54 is arranged on the side of the grip part of the camera. On the side opposite to the film cartridge chamber 54 across the light blocking tube 59 and on the side of the spool chamber 55 with respect to the optical axis of the photo-taking lens 57, the battery chamber 61 is formed above the spool chamber 55. This layout effectively minimizes a width K (see FIG. 1) of the camera. Besides, a dimension (distance) H (see FIG. 1) from the optical axis of the photo-taking lens 57 to the lower surface of the camera is set to the smallest possible size corresponding to the film cartridge chamber 54. The main capacitor 45 the diameter of which is arranged to be equal to a distance from the lower surface of the camera to the lower side of the light blocking tube 59 is disposed below the light blocking tube 59. The flash device oscillating circuit parts thus can be disposed behind the main capacitor 45 (see FIG. 2). The layout permits the camera to be arranged to have an apposite height J (see FIG. 1) to give a good camera holding feeling.

It is another advantage that a camera shake due to a shutter release operation is minimized since the release button 50 is disposed close to the photo-taking lens 57.

Further, with the reduction gear system for film winding and rewinding arranged below the spool chamber 55, the vertically penetrating shaft 9 is arranged between the battery 51 disposed above the spool chamber 55 and the lens barrel driving motor 21 and the flash emitting part 20 to connect the gears to the fork gear 17 disposed below the release button 50. The gear connecting arrangement permits the uppermost part of the camera to be connected to the right and left parts of the camera. The layout permits a greater latitude to the design of the viewfinder optical system, so that the viewfinder objective lens system (27 to 29) can be arranged closest to the photo-taking lens 57 to give a large, easily viewable viewfinder having a minimum parallax.

Further, according to the layout, the battery 51 can be axially taken out and the battery chamber 61 can be formed by using a minimum space.

Since the flash emitting part 20 can be set at the upper right corner as viewed from the front of the camera, the layout permits the camera to have a maximum distance between the photo-taking lens 57 and the flash emitting part 20. The layout not only minimizes the possibility of having the red-eye phenomenon but also almost completely eliminates the possibility of having the flash light eclipsed by some of fingers of the left hand when the camera is held by two hands.

According to the structural layout of the embodiment described, the camera can be arranged in a size measuring 57.5 mm in height and 85 mm in width, which is about the same as an ordinary season ticket for electric train and can be easily put into a pocket.

Figure 8:
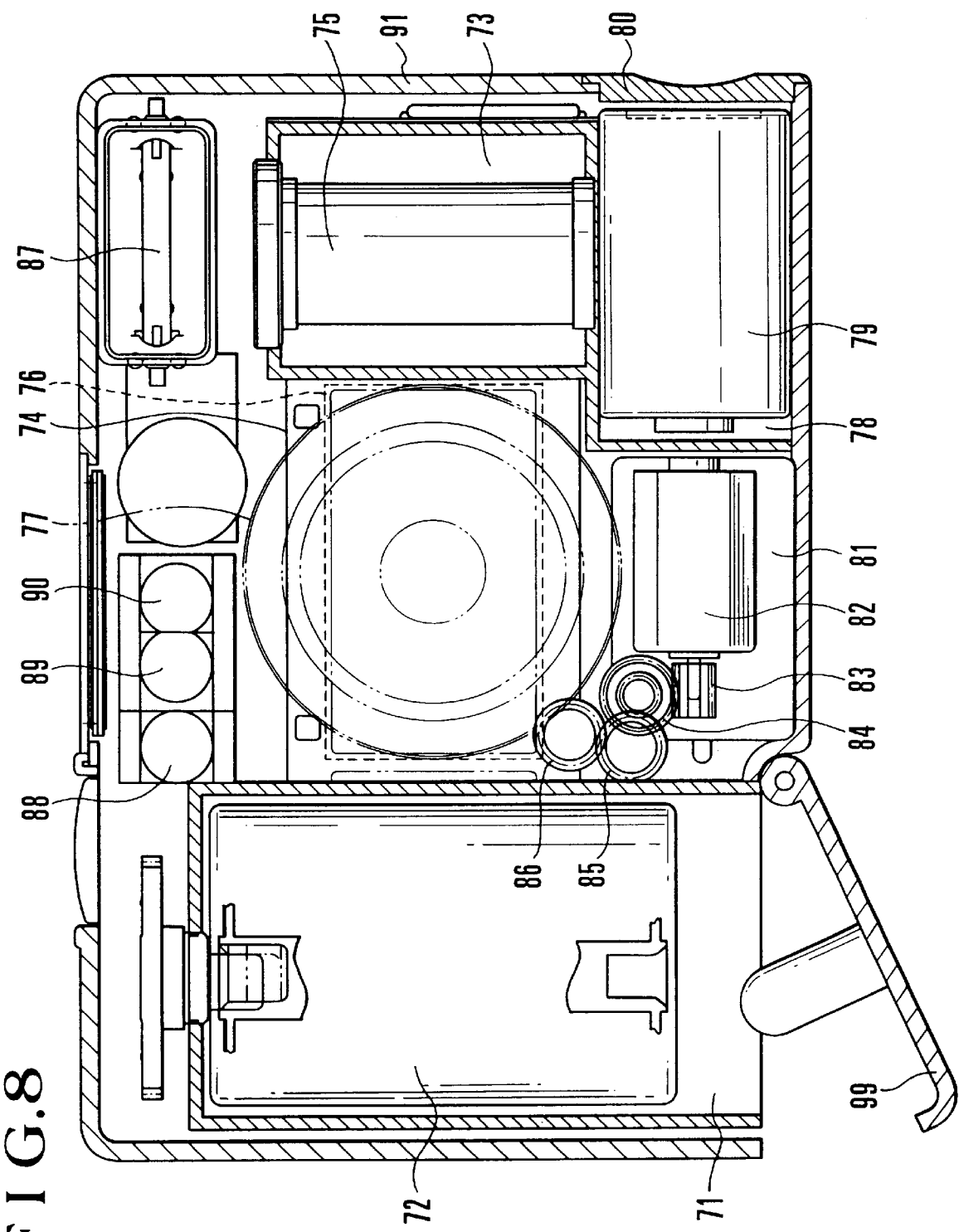
FIG. 8 is a vertical sectional view showing the layout of a whole camera arranged according to this invention as a second embodiment thereof.
Figure 9:
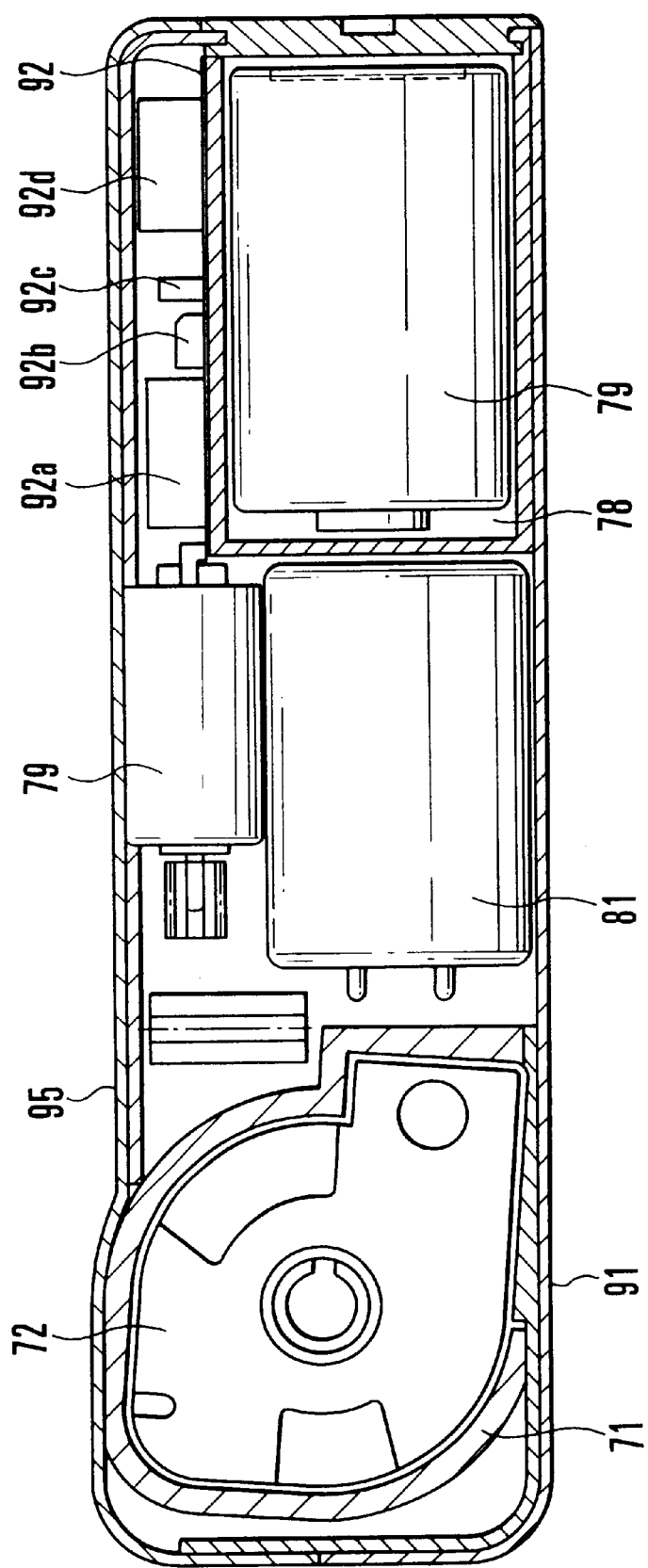
FIG. 9 is a transverse sectional view of the camera of FIG. 8 taken from the lower side thereof.
Figure 10:
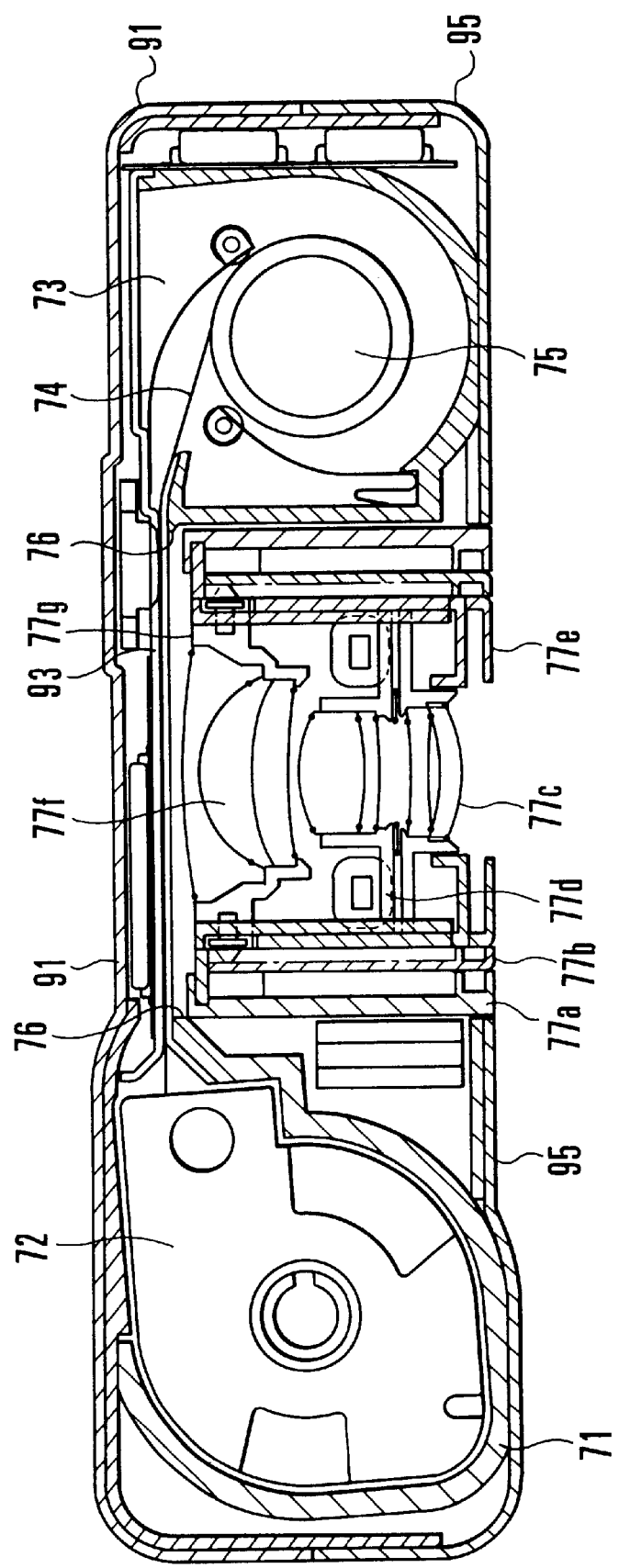
FIG. 10 is a central transverse sectional view of the camera of FIG. 8 taken along the optical axis of a photographic-lens of the camera.
Figure 11:
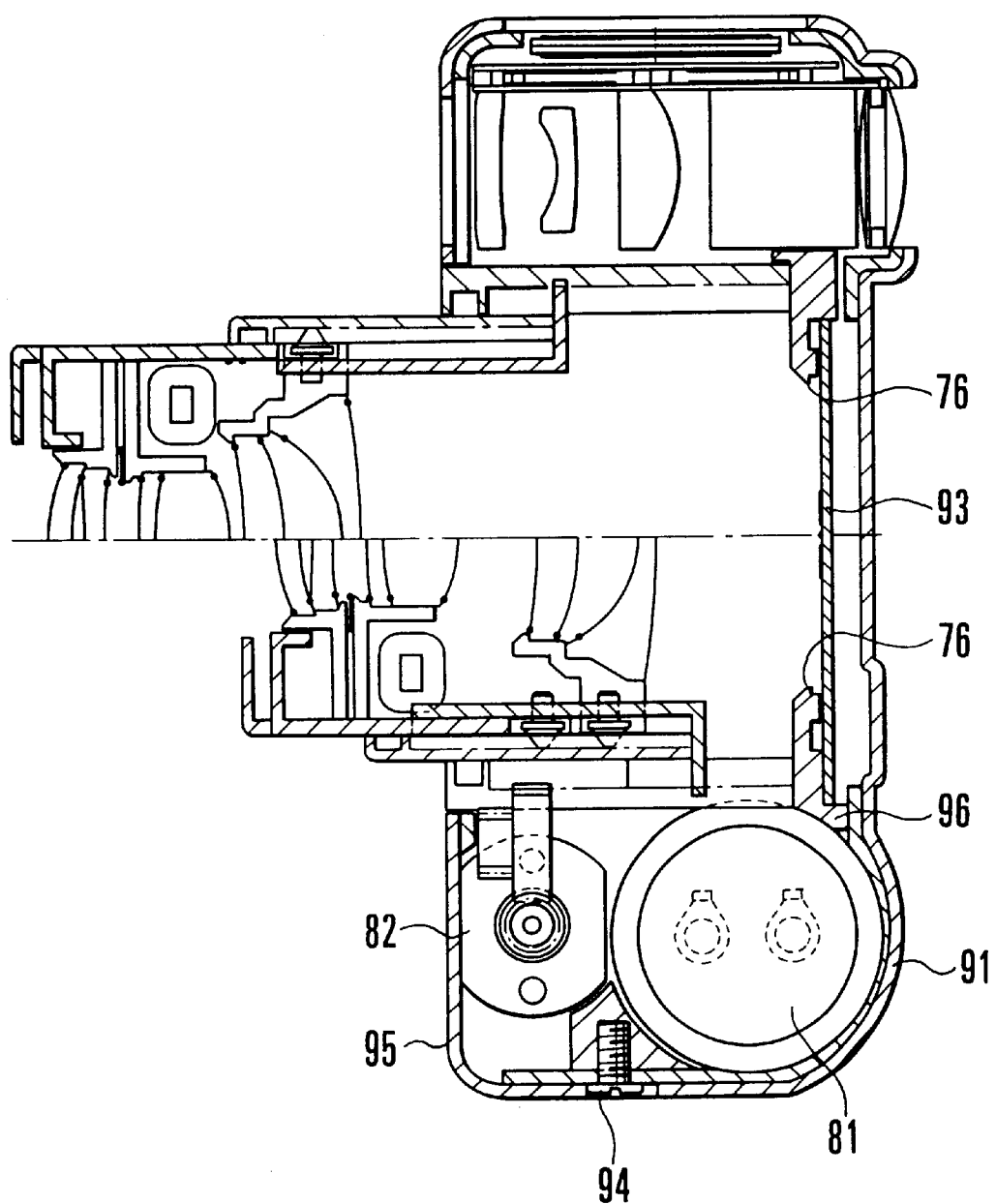
FIG. 11 is a vertical sectional view of the camera of FIG. 8 taken across the middle part thereof.
Figure 12:
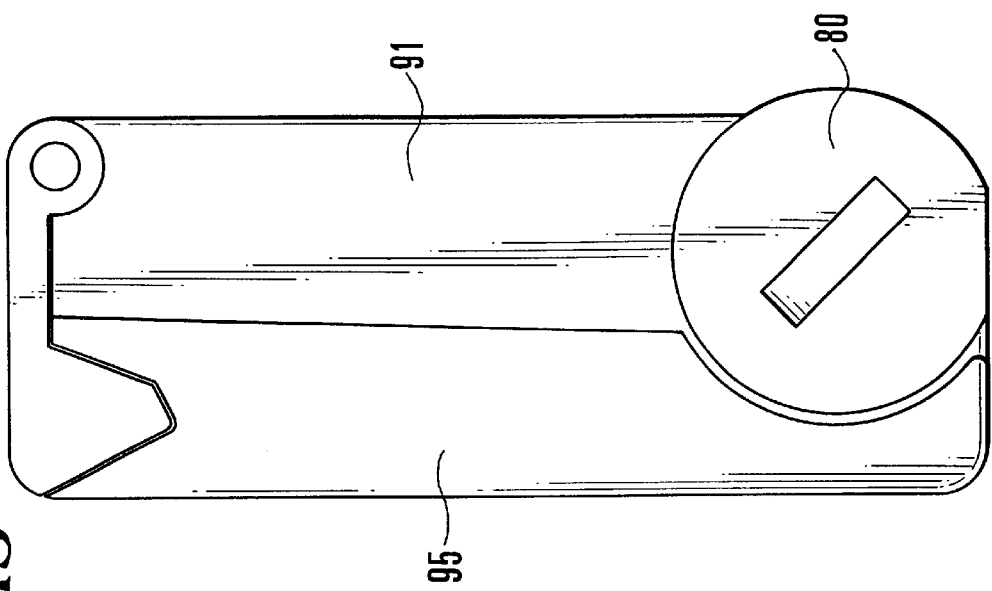
FIG. 12 is a vertical sectional view of a spool chamber of the camera of FIG. 8.
Figure 13:
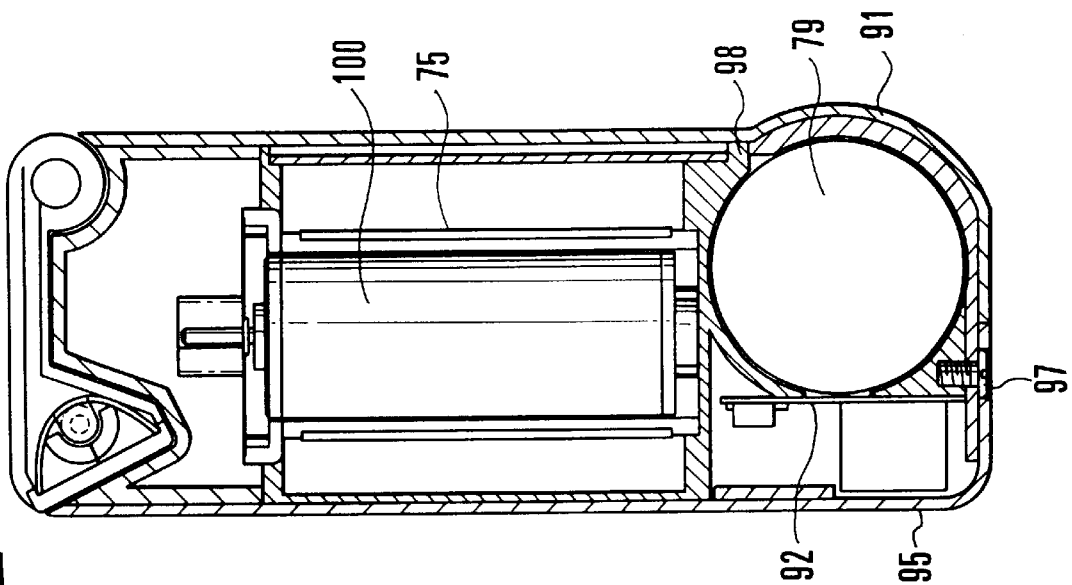
FIG. 13 is a side view of the camera of FIG. 8 taken on the side of a battery chamber.
Figure 14:
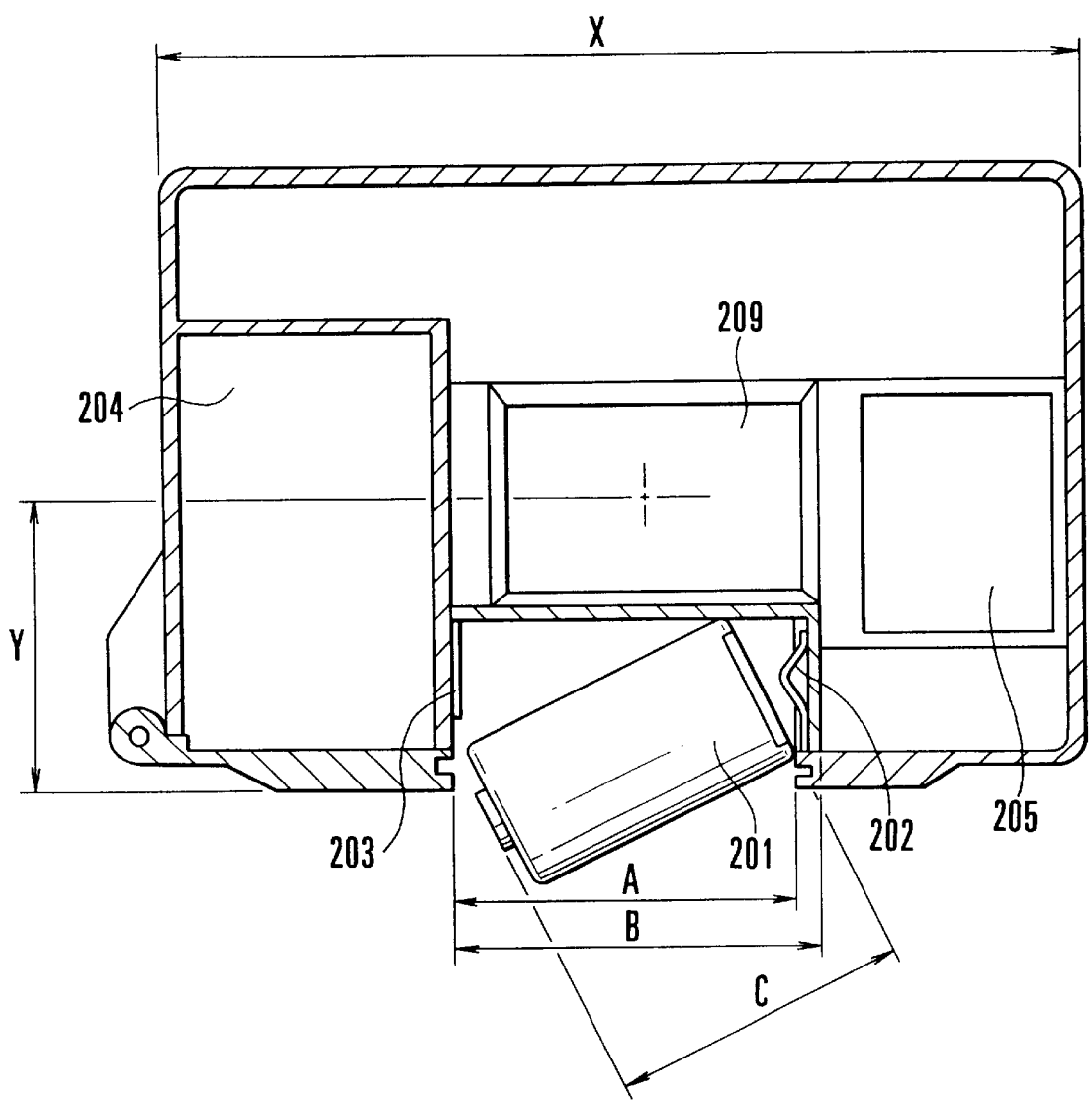
FIG. 14 is a vertical sectional view showing the layout of a conventional camera.

A second embodiment of this invention is next described as follows: FIGS. 8 to 13 relate to a camera which is the second embodiment. FIG. 8 is a vertical sectional view showing almost the whole layout of the camera. FIG. 9 is a transverse sectional view taken from the lower side of the camera of FIG. 8. FIG. 10 is a central transverse sectional view taken along the optical axis of a photographic lens of the camera of FIG. 8. FIG. 11 is a vertical sectional view taken across the middle part of the camera of FIG. 8. FIG. 12 is a vertical sectional view taken across a spool chamber of the camera of FIG. 8. FIG. 13 is a side view taken on the side of a battery chamber of the camera of FIG. 8.

Referring first mainly to FIG. 8 of the figures, the camera is arranged as follows: A cartridge chamber 71 is provided for housing a film cartridge 72. A spool chamber 73 has a film take-up spool 75 arranged therein to wind a film 74 sent out from the film cartridge 72. An aperture 76 is provided between the cartridge chamber 71 and the spool chamber 73 for exposing to light the film 74 sent out from the film cartridge 72. A cylindrical photo-taking optical unit 77 has a function of retracting a lens barrel into a camera body and also a zooming function. A battery chamber 78 is provided for housing a cylindrical battery 79 which is a power source for the camera and has the height of the cylindrical shape in the longitudinal direction thereof. The battery chamber 78 is arranged below the spool chamber 73 to house the cylindrical battery 79 with its longitudinal direction set sideways. A battery chamber lid 80 is provided on one side of the camera for loading and taking out the cylindrical battery 79 by pushing and pulling it in its longitudinal direction into and out of the battery chamber 78. The battery chamber lid 80 is detachably attached in a bayonet manner to the back cover 91 of the camera body. A main capacitor 81 for a flash device has the height of its cylindrical shape in its longitudinal direction. The main capacitor 81 is laid below the cylindrical photo-taking optical unit 77 with its longitudinal direction set sideways and is arranged side by side with the cylindrical battery 79 in the longitudinal direction thereof.

A lens barrel driving motor 82 is arranged in front of the main capacitor 81 for the flash device to drive the cylindrical photo-taking optical unit 77 to perform its barrel retracting and zooming actions. The driving force of the lens barrel driving motor 82 is transmitted to the cylindrical photo-taking optical unit 77 through a worm gear 83 secured to the output shaft of the motor 82 and a reduction gear train (84 to 86). The camera includes a flashing emitting part 87, a light measuring sensor 88 and light projecting and receiving sensors 89 and 90 which are provided for automatic focusing. The cartridge chamber 71 is provided with an opening-and-closing lid 99 for loading and unloading the film cartridge 72 into and out of the cartridge chamber 71.

Referring to FIG. 9, a circuit unit 92 which includes a flash device circuit is disposed in front of the battery chamber 78. The circuit unit 92 is arranged to use the cylindrical battery 79 for charging the main capacitor 81 of the flash device and for causing the flash emitting part 87 of the flash device to flash using the charged energy of the main capacitor 81.

The construction of the cylindrical photo-taking optical unit 77 is as shown in FIG. 10. A fixed lens tube 77a is disposed in the outermost part of the unit 77 and is arranged to have a helicoid or a cam groove formed on its inner side and to serve as a light-blocking tube up to a part where the aperture 76 is formed. On the inner side of the fixed lens tube 77a, there is provided an intermediate cylindrical lens tube 77b which is arranged to rotate to be drawn out in the direction opposite to the aperture 76. On a further inner side, there is provided a first lens group tube 77e which is arranged to carry a first lens group 77c and a shutter unit 77d and to be rectilinearly movable while being drawn out in the direction opposite to the aperture 76 without rotating. A second lens group tube 77g is arranged in rear of the first lens group tube 77e to carry a second lens group 77f and to be rectilinearly movable while being drawn out also in the direction opposite to the aperture 76 without rotating. Reference numeral 93 denotes a pressing plate.

Referring to FIGS. 11 and 12, a front cover 95 and a rear cover 91 are secured to the camera body with screws 94 and 97, respectively. Projections 96 and 98 extend along the cylindrical surface of the cylindrical battery 79 and that of the main capacitor 81 of the flash device downward respectively between the rear cover 91 of the camera body and these cylindrical surfaces, and thus arranged to shield the spool chamber 73 and the aperture 76 from light by engaging the pressing plate 93. A film transport motor 100 which is provided for transporting the film 74 is disposed within the film take-up spool 75.

In the structural arrangement described, the cylindrical photo-taking optical unit 77 is arranged to have a largest possible diameter within a space encompassed with the cartridge chamber 71, the spool chamber 73 and the aperture 76 for the purpose of obtaining a higher photo-taking optical power. A height difference between the cartridge chamber 71 and the spool chamber 73 which is lower in height than the cartridge chamber 71 gives a larger height difference space than a height difference between the cylindrical photo-taking optical unit 77 and the cartridge chamber 71. A long space extends from the lower side of the spool chamber 73 which gives the larger height difference space to the lower side of the rising part of the cylindrical photo taking optical unit 77 located on the side of the spool chamber 73 with respect to the optical axis of the cylindrical photo-taking optical unit 77. By using this long space, the battery chamber 78 is arranged to have the cylindrical battery 79 which has a relatively large fixed diameter set there in a posture of having its longitudinal direction set sideways. Further, the main capacitor 81 which has some latitude in its diameter and length and is of a smaller diameter than the cylindrical battery 79 is placed within the height difference space between the cylindrical photo-taking optical unit 77 and the cartridge chamber 71 on one side of the battery chamber 78 in a posture of having its longitudinal direction set sideways.

This arrangement makes the lower side of the cartridge chamber 71, that of the battery chamber 78 and that of the main capacitor 81 of the flash device to be located at about the same height. With these lower sides arranged to be the lower side of the camera, the camera having the cylindrical photo-taking optical unit 77 which has a high optical performance can be efficiently arranged in a very compact shape.

Further, with the space obtained by a difference in height (the height difference space) between the cylindrical photo-taking optical unit 77 and the cartridge chamber 71 located on one side of the battery chamber 78 used for the main capacitor 81 of the flash device, a capacitor which is of a large capacity and is capable of supplying a sufficiently large charged flashing energy to the flash emitting part 87 can be efficiently arranged as the main capacitor 81 of the flash device. Further, in the case of this embodiment, the outermost diameter of the cylindrical photo-taking optical unit 77 is defined by the fixed cylindrical lens tube 77a, and the lower part of the fixed cylindrical lens tube 77a is arranged to have a thin thickness in part to allow the main capacitor 81 of the flash device to be slid into a space additionally provided by the thin part. This arrangement permits a further increase in size of the main capacitor 81 to permit supply of a larger flashing energy without increasing the size of the camera.

The battery chamber 78 is formed mostly below the spool chamber 73 to prevent any interference with the cylindrical photo-taking optical unit 77. Therefore, the aperture 76 can be prevented from having a leak of light into it when the battery 79 is replaced.

Further, the embodiment is arranged to permit the battery chamber 78 and the main capacitor 81 of the flash device to be arranged within one cylindrical space on the rear side of the camera by arranging the battery chamber 78 and the cylindrical main capacitor 81 of the flash device to have their axes closely in alignment and by arranging the diameter of the battery chamber 78 and that of the cylindrical main capacitor 81 of the flash device to be equal to each other. Therefore, the lens barrel driving motor 82, the worm gear 83 and the reduction gear train (84 to 86) are disposed in front of the main capacitor 81 of the flash device. The circuit parts 92a to 92d of the circuit unit 92 are disposed in front of the battery chamber 78. Further, the circuit unit 92 is electrically connected to the lens barrel driving motor 82. The lens barrel driving motor 82, the worm gear 83, the reduction gear train (84 to 86) and the circuit unit 92 are thus efficiently and highly densely arranged on the front side of the camera below the spool chamber 73 and the cylindrical photo-taking optical unit 77. Further, with the battery chamber 78 and the cylindrical main capacitor 81 of the flash device arranged in a cylindrical space as mentioned above, the front and rear cover 95 and 91 of the camera body can be secured to the camera body with the screws 94 and 97 by utilizing the rising spaces of the battery chamber 78 and the cylindrical main capacitor 81 of the flash device. The layout arrangement not only allows a greater amount of latitude in design but also facilitates securing spaces for screwing.

Further, the projections 96 and 98 which engage the pressing plate 93 to shield the spool chamber 73 and the aperture 76 from light can be formed approximately in the same shape as spaces obtained between the rear cover 91 of the camera body and the cylindrical surfaces of the cylindrical battery 79 and the main capacitor 81 of the flash device. The spaces are thus efficiently used.

The cylindrical battery 79 is arranged to be longitudinally inserted and taken out into and from the battery chamber 78 from one side of the camera. This arrangement permits the front and rear covers 95 and 91 of the camera body to be secured to the camera body with the screws 94 and 97 by utilizing the raising spaces of the battery chamber 78 and the cylindrical main capacitor 81 of the flash device as mentioned above. Further, the projections 96 and 98 which shield the spool chamber 73 and the aperture 76 from light by engaging the pressing plate 93 can be formed to extend downward along the cylindrical surface of the cylindrical battery 79 and that of the main capacitor 81 of the flash device. If the cylindrical battery 79 is arranged to be loaded and unloaded from below the camera, it would become impossible to have the front and rear covers 95 and 91 of the camera body secured to the camera body by using the rising spaces of the battery chamber 78 and the cylindrical main capacitor 81 of the flash device. If the cylindrical battery 79 is arranged to be loaded and unloaded from behind the camera body, it would become impossible to have the projections 96 and 98 which shield the spool chamber 73 and the aperture 76 from light by engaging the pressing plate 93 formed to extend downward along the cylindrical surface of the cylindrical battery 79 and that of the main capacitor 81 of the flash device between the rear cover 91 of the camera body and these cylindrical surfaces.

In each of the embodiments of this invention described above, the camera is arranged to transport the film in the transverse direction. If the camera is of the kind vertically transporting the film, the structural arrangement described above is of course turned round 90 degrees. This invention is not limited to the embodiments described. In accordance with this invention, a camera may be variously arranged in different manners. For example, the main capacitor of the flash device may be disposed above the photo-taking optical unit. Both the battery chamber and the main capacitor of the flash device may be arranged above the spool chamber and the photo-taking optical unit. The battery chamber may be arranged either above or below the cartridge chamber. In a case where both the battery chamber and the main capacitor of the flash device are disposed respectively above the spool chamber and the photo-taking optical unit, the efficiency of space allocation can be greatly enhanced by arranging the light measuring sensor, the light projecting and receiving sensors for automatic focusing, the flash emitting part of the flash device, etc., in front of the battery chamber and the main capacitor of the flash device.

In the embodiments described, the arrangement of the projections which shield the spool chamber and the aperture from light by engaging the pressing plate may be changed to shield these parts from light by engaging a cover of the camera body or some other structural member instead of engaging the pressing plate.

This invention applies not only to the camera of the kind using a cylindrical photo-taking optical unit, a cylindrical battery and a cylindrical main capacitor of a flash device but also to a camera using a photo-taking optical unit, a battery and a flash-device main capacitor of any shapes other than the cylindrical shape, such as a prismatic shape, etc.

This invention applies also to cameras of a kind using a cartridge of an image recording medium other than a film or using a cartridge of some other types.

Further, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the individual components shown in schematic or block form in the drawings are all well known in the camera arts and their specific construction and operation are not critical to the operation or best mode for carrying out the invention.

Further, this invention is applicable to a case where the embodiments or their technological elements are combined in any desired manner.

Further, this invention is applicable to a case where the whole or a part of the appended claims or the arrangement of the embodiments described forms an apparatus or a device which is arranged to be coupled with some other device or to form a component of an apparatus.

Further, this invention is applicable also to cameras of varied kinds including a single-lens reflex camera, a lens-shutter type camera, a video camera, to an optical apparatus or an apparatus other than cameras or to component elements of such apparatuses.

What is claimed is:

1. A camera, comprising:
   a) a cartridge chamber,
   b) a recording medium winding chamber, having a length shorter than the cartridge chamber in a direction perpendicular to a movement direction of a recording medium between the cartridge chamber and the recording medium winding chamber,
   c) a battery chamber located, relative to the recording medium winding chamber, at a position deviated in a direction perpendicular to the movement direction of the recording medium, and
   d) a flash emitting part located, relative to the recording medium winding chamber, at a position deviated in a direction perpendicular to the movement direction of the recording medium.

2. A camera according to claim 1, wherein the flash emitting part and the battery are disposed on the same side relative to the recording medium winding chamber.

3. A camera according to claim 1, wherein the battery chamber and the flash emitting part are disposed on an upper side of the camera, relative to the recording medium winding chamber.

4. A camera according to claim 1, wherein the battery chamber is disposed behind the flash illuminating portion.

5. A camera according to claim 1 wherein the battery chamber is disposed by using a space created by a height difference between the recording medium winding chamber and the cartridge chamber.

6. A camera according to claim 1, wherein the flash emitting part is disposed by using a space created by a height difference between the recording medium winding chamber and the cartridge chamber.

7. A camera according to claim 1, wherein the battery chamber and the flash emitting part are disposed by using a space created by a step difference between the recording medium winding chamber and the cartridge chamber.

8. A camera according to claim 1, further comprising a capacitor for supplying flash emitting energy to the flash emitting part, said capacitor being disposed of a position perpendicular to a moving direction of the recording medium, relative to the cartridge chamber.

9. A camera according to claim 1, further comprising a capacitor for supplying a flash emitting energy to the flash emitting part, said capacitor being disposed in a position perpendicular to a moving direction of the recording medium, relative to a photo-taking optical path.

10. A camera according to claim 9, wherein the capacitor is disposed on a lower side of the camera relative to the photo-taking path.

11. A camera according to claim 1, further comprising a capacitor for supplying a flash emitting energy to the flash emitting part, said capacitor being disposed in line with the battery chamber in a direction parallel to a moving direction of the recording medium.

12. A camera according to claim 1, wherein said battery chamber does not extend to a position perpendicular to a moving direction of the recording medium, relative to an optical axis of a photo-taking optical system disposed in a photo-taking optical path.

13. A camera according to claim 12, wherein the photo-taking system includes a cylindrical barrel.

14. A camera according to claim 1, wherein the recording medium includes an image recording medium.

15. A camera according to claim 1, wherein the recording medium includes a film.

16. A camera according to claim 1, wherein the battery chamber is accommodated with its lengthwise direction being in a lateral direction of the camera.

17. A camera according to claim 1, wherein the battery chamber is taken in and out in its lengthwise direction.

18. A camera, comprising:
   a) a cartridge chamber,
   b) a recording medium winding chamber, said chamber having a length shorter than the cartridge chamber in a direction perpendicular to a moving direction of a recording medium between the cartridge chamber and the recording medium winding chamber,
   c) a battery chamber located, relative to the recording medium winding chamber, at a position deviated in a direction perpendicular to the moving direction of the recording medium, but not extending to a position deviated in a direction perpendicular to the moving direction of the recording medium, relative to an optical axis of a photo taking system disposed in a photo-taking optical path, and
   d) a flash emitting part located, relative to the recording medium winding chamber, at a position deviated in a direction perpendicular to the moving direction of the recording medium.

19. A camera according to claim 18, wherein the battery chamber and the flash emitting part are disposed on the same side relative to the recording medium winding chamber.

20. A camera according to claim 18, wherein the battery chamber and the flash emitting part are disposed on an upper side of the camera relative to the recording medium winding chamber.

21. A camera according to claim 18, wherein the battery chamber is disposed behind the flash emitting part.

22. A camera according to claim 18, wherein the battery chamber is disposed by using a space created by a height difference between the recording medium winding chamber and the cartridge chamber.

23. A camera according to claim 18, wherein the flash emitting part is disposed by using a space created by a height difference between the recording medium winding chamber and the cartridge chamber.

24. A camera according to claim 18, wherein the battery chamber and the flash emitting part are disposed by using a space created by a height difference between the recording medium winding chamber and the cartridge chamber.

25. A camera according to claim 18, further comprising a capacitor for supplying flash emitting energy to the flash emitting part, said capacitor being disposed with avoidance of a position perpendicular to the moving direction of the recording medium relative to the cartridge chamber and with avoidance of a path of the recording medium.

26. A camera according to claim 18, wherein the photo-taking optical system includes a cylindrical barrel.

27. A camera according to claim 18, wherein the recording medium includes an image recording medium.

28. A camera according to claim 18, wherein the recording medium includes a film.

29. A camera according to claim 18, wherein the battery chamber is accommodated with its lengthwise direction being in a lateral direction of the camera.

30. A camera according to claim 18, wherein the battery is taken in and out in its lengthwise direction.

31. A camera, comprising:
   a) a cartridge chamber,
   b) a recording medium winding chamber,
   c) a battery chamber disposed by using a space created by a height difference between the cartridge chamber and the recording medium winding chamber, and
   d) a flash emitting part disposed by using a space created by a height difference between the cartridge chamber and the recording medium winding chamber.

32. A camera according to claim 31, wherein the battery chamber and the flash emitting part are disposed on the same side relative to the recording medium winding chamber.

33. A camera according to claim 31, wherein the battery chamber is disposed behind the flash emitting part.

34. A camera according to claim 31, further comprising a capacitor for supplying flash emitting energy to the flash emitting part, said capacitor being disposed, with avoidance of a position perpendicular to the moving direction of the recording medium, relative to the cartridge chamber.

35. A camera according to claim 31, further comprising a capacitor for supplying flash emitting energy to the flash emitting part, said capacitor being disposed at a position perpendicular to the moving direction of the recording medium, relative to a photo-taking optical path.

36. A camera according to claim 35, wherein the capacitor is disposed on a lower side of the camera relative to the photo-taking optical path.

37. A camera according to claim 31, further comprising a capacitor for supplying flash emitting energy to the flash emitting part, said capacitor being disposed in line with the battery chamber in a direction parallel to the moving direction of the recording medium.

38. A camera according to claim 31, wherein the battery chamber does not extend to a position perpendicular to the moving direction of the recording medium, relative to an optical axis of a photo-taking optical system disposed in a photo-taking optical path.

39. A camera according to claim 38, wherein the photo-taking optical system includes a cylindrical barrel.

40. A camera according to claim 31, wherein the recording medium includes an image recording medium.

41. A camera according to claim 31, wherein the recording medium includes a film.

42. A camera according to claim 31, wherein the battery chamber is accommodated with its lengthwise direction being in a lateral direction of the camera.

43. A camera according to claim 31, wherein the battery chamber is taken in and out in its lengthwise direction.

44. A camera, comprising:
   a) a flash emitting part, and
   b) a battery chamber disposed directly behind the flash emitting part, said battery chamber being arranged in a direction parallel to the lengthwise direction of the flash emitting part, above a space for a recording medium and at a position deviated perpendicular to a movement direction of the recording medium between a recording medium cartridge chamber and a recording medium winding chamber.

45. A camera according to claim 44, further comprising a capacitor for supplying flash emitting energy to the flash emitting part, said capacitor being disposed, with avoidance of a position perpendicular to a moving direction of a recording medium relative to a cartridge chamber and with avoidance of a path of the recording medium.

46. A camera according to claim 44, further comprising a capacitor for supplying flash emitting energy to the flash emitting part, said capacitor being disposed at a position perpendicular to a moving direction of a recording medium, relative to a photo-taking optical path.

47. A camera according to claim 46, wherein the capacitor is disposed on a lower side of the camera relative to the photo-taking optical path.

48. A camera according to claim 44, further comprising a capacitor for supplying flash emitting energy to the flash emitting part, said capacitor being disposed in line with the battery chamber in a direction parallel to a moving direction of a recording medium.

49. A camera according to claim 44, wherein the battery chamber does not extend to a position perpendicular to a moving direction of a recording medium, relative to an optical axis of a photo-taking optical system disposed in a photo-taking optical path.

50. A camera according to claim 49, wherein the photo-taking optical system includes a cylindrical barrel.

51. A camera according to claim 44, wherein the recording medium includes an image recording medium.

52. A camera according to claim 44, wherein the recording medium includes a film.

53. A camera according to claim 44, wherein the battery chamber is accommodated with its lengthwise direction being in a lateral direction of the camera.

54. A camera according to claim 44, wherein the battery chamber is taken in and out in its lengthwise direction.

* * * * *